April 8, 1958 C. J. BOGAN 2,829,619
ARTIFICIAL HORIZONS FOR AIRCRAFT
Filed March 26, 1956 2 Sheets-Sheet 1

INVENTOR
CHARLES J. BOGAN
BY
Herbert H. Thompson
his ATTORNEY.

April 8, 1958   C. J. BOGAN   2,829,619
ARTIFICIAL HORIZONS FOR AIRCRAFT
Filed March 26, 1956   2 Sheets-Sheet 2

INVENTOR
CHARLES J. BOGAN
BY
Herbert B. Thompson
his ATTORNEY.

United States Patent Office 2,829,619
Patented Apr. 8, 1958

2,829,619

ARTIFICIAL HORIZONS FOR AIRCRAFT

Charles J. Bogan, Amityville, N. Y., assignor to Sperry Rand Corporation, a corporation of Delaware Application March 26, 1956, Serial No. 573,741

3 Claims. (Cl. 116—124)

This invention relates to artificial horizons for indicating the attitude of aircraft in both roll and pitch, and more particularly to the type of artificial horizon wherein the indicating element stabilized from a gyro vertical or similar instrument is in the shape of a sphere having a normally horizontal equatorial line. Usually the half of the sphere below this line is of one color and the upper half of a contrasting color so that the line of demarcation indicates the horizon. This sphere is usually viewed through an opening in a casing mounted on the panel in front of the aviator and around or on which graduations may be placed to indicate the amount of bank and pitch.

In prior types of such instruments, the artificial horizon line gives an accurate picture of the craft's attitude during bank and during pitch, but when both bank and pitch occur at the same time the horizon line does not give a true simulation of either of these components, especially the roll component. This is due largely to the spherical shape of the indicator which causes the edges of the same to lie much farther from the window with its circumferential graduations than the center of the sphere giving rise to parallax errors. By my invention, I overcome this difficulty in artificial horizons by extending the ground and sky picture or horizon indicator to a ring around the window of said housing and stabilizing it only in roll. Hence the horizon demarcation line on the ring gives an accurate picture of the roll attitude which may be read against roll graduations on the case, regardless of the pitch angle. Such indication also remains visible under all conditions of pitch, whereas in the present type indicator the horizon line disappears for a pitch of over about 30° to 45° since it is usual to move the sphere through an angle greater than the pitch angle of the craft, especially near its normal or central position.

Referring to the drawings illustrating a couple of forms the invention may assume, Fig. 1 is a face view of my improved artificial horizon as it would appear in normal level flight;

Figures 1, 2:
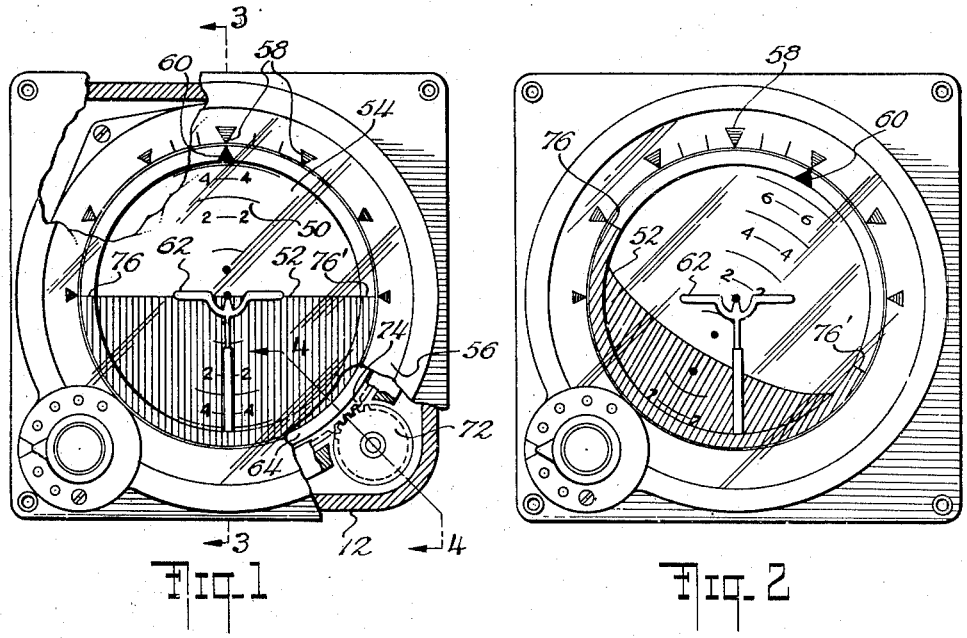
Fig. 2 is a similar view showing the appearance of the artificial horizon of the craft if pitched upwardly and banked to the left.
Figure 3:
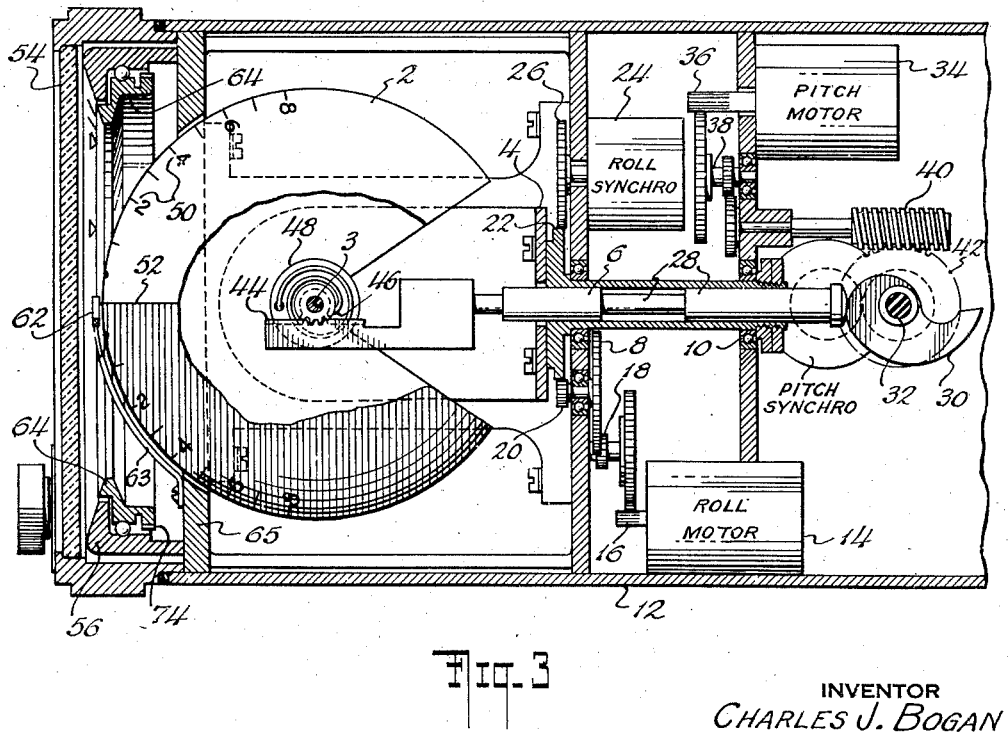
Fig. 3 is a vertical longitudinal cross section of my improved artificial horizon on a larger scale, parts being in elevation, and taken on line 3—3 of Fig. 1.

While my improvement is adapted for an artificial horizon stabilized directly from a gyro vertical, or indirectly by remote control from a gyro vertical or the like, I have shown in the drawings only the latter form artificial horizon. As shown, a spherical shell 2 is journalled for freedom about a normally horizontal transverse axis 3 in a gimbal ring 4 preferably open at the front and mounted on a sleeve 6 journalled on a fore and aft axis in bearings 8 and 10 in the enclosing housing 12, so that the position of the sphere about the axis of sleeve 6 indicates roll. To stabilize the sphere about the roll axis, I have shown a roll repeater motor 14 adapted to be controlled from a transmitter on the roll axis of the gyro vertical (not shown). The roll motor is shown as connected through pinion 16 and double reduction gearing 18 and 20 to gear 22 mounted on the sleeve 6 of the gimbal, thereby stabilizing it against roll. A roll transmitter 24 may also be driven from gear 22 by pinion 26.

For causing pitch of the sphere when the aircraft pitches, there is shown a shaft or stem 28 extending freely through sleeve 6 and engaged at its rear end by cam 30 on cross shaft 32. Said shaft 32 is shown as turned from the pitch motor 34 through pinion 36, reduction gearing 38 and worm and worm wheel 40, 42, the latter being on shaft 32, which motor 34 is actuated from the usual pitch transmitter (not shown) on the gyro vertical. When the cam 30 is turned, therefore, shaft 28 will be moved axially fore or aft and thereby move the rack bar 44 fore or aft to rotate the pinion 46 on a horizontal trunnion 48 mounting the sphere on a roll axis within the gimbal 4. The cam is so shaped that the sphere is moved in the same direction as the horizon appears to move upon pitching of the carft and may be so designed that the pitch is exaggerated when the pitch angle is small. The pitch graduations 50 are unequally spaced accordingly on the sphere. The lower half of the sphere is colored in one color, while the upper half is colored in a different color so that the horizontal equatorial line 52 between the two colors represents the horizon, i. e., constitutes an artificial horizon.

The casing 12 enclosing the instrument is shown as provided with a front window 54 within which is a concentric fixed bezel ring 56 upon which roll graduations 58 may be placed which may be read in connection with roll index 60 at the top. Immediately in front of the sphere is placed index device 62 preferably indicative of an aircraft and its wings. Index 62 may be mounted on a thin curved strip 63 secured to concealing mask 65. This index appears against the horizon line 52 so that the tilt of the artificial horizon with respect to the aircraft will directly show the roll of the craft, while the pitch of the craft will also be shown by the relative up and down displacement of the horizon line with respect to the same index 62. The amount of roll is shown by reading index 60 on graduations 58 and the amount of pitch by reading horizon line 52 of graduations 50 on the sphere.

Figure 4:
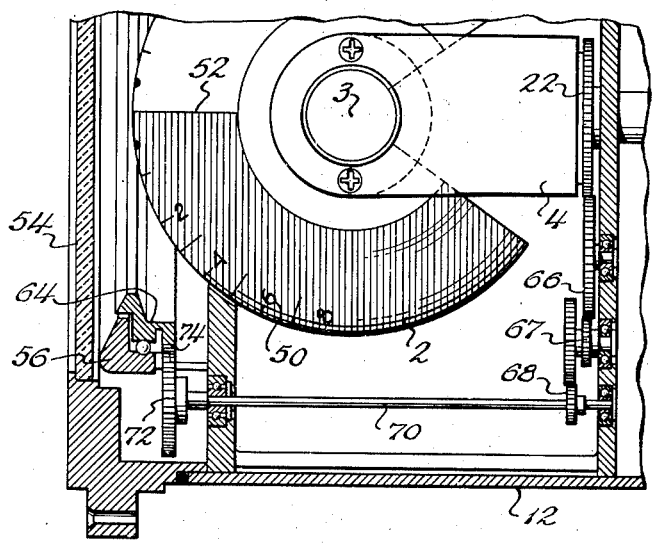
Fig. 4 is a similar section but taken on line 4—4 of Fig. 1.

However, when both pitch and roll occur, the horizon line 52 does not give a true picture of the roll of the craft as appears from Fig. 2 showing a combined roll and pitch condition. To overcome this difficulty, I provide a rotatable ring 64 journalled within the bezel 56 and stabilized only in roll by being connected through trains 66 and 67 between the gear 22 on the gimbal ring and pinion 68 on shaft 70. Said shaft in turn is geared to the ring 64 through gear 72 and spur gear 74 on said ring (Fig. 4). By such or similar means, the ring 64 is stabilized against roll so that the tilt angle of the index 60 thereon shows the true roll angle of the craft against fixed scale 58. The tilt angle may also be shown by observing the horizon line demarcation 76 on the ring which remains true for combined roll and pitch. Preferably I color or differentially mark the upper and lower halves of the ring 64 so as to provide the aforesaid auxiliary horizon marks 76, 76' which normally lie in line with horizon line 52, as shown in Fig. 1. Upon combined roll and pitch, the markings 76, 76' continue to show the true roll as well as index 60, whereas the horizon line 52 no longer accurately represents the attitude of the craft due to the factors mentioned hereinbefore.

Figure 5:
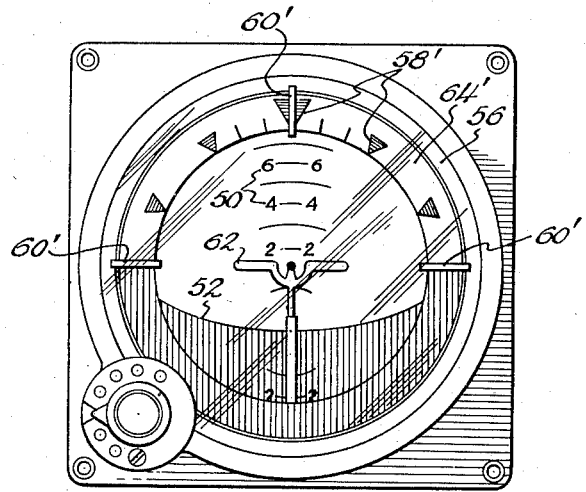
Fig. 5 is a face view of a modified form of the invention.

The form shown in Fig. 5 differs from the form shown in Figs. 1 to 4 only in the arrangement of the markings on the ring 64' and bezel 56. In Fig. 5, the graduations 58' are placed on the ring 64' instead of on the bezel 56 (which may be omitted entirely) while index 60' is fixed to the casing. Therefore, in this form of the invention the outer diameter of the roll ring 64 may be extended to cover the area formerly occupied by the bezel. This arrangement will also produce a reversal in the sensing of the markings with the advantage that the indices and the fixed airplane 62 in the center will now appear to rotate in the same direction as the aircraft vertical, replacing the rotating pointer 60 which appears to move oppositely to the roll of the aircraft vertical.

Since many changes could be made in the above construction and many apparently widely different embodiments of this invention, could be made without departing from the scope thereof, it is intended that all matter contained in the above description or shown in the accompanying drawings shall be interpreted as illustrative and not in a limiting sense.

What is claimed is:

1. In an attitude indicator for aircraft, the combination comprising a housing having a viewing opening in a wall thereof, a member universally mounted in said housing and having a spherical face and positioned in said housing to be viewed through said opening, said face having upper and lower halves of distinctive colors providing a horizon or equatorial line of demarcation therebetween, a gimbal pivotally supported about a roll axis in said housing, said member being pivotally supported in said gimbal about a normal pitch axis, means for positioning said gimbal in accordance with the roll attitude of said aircraft, means for positioning said member within its gimbal in accordance with the pitch attitude of the craft whereby said horizon line simulates apparent movements of the real horizon, a ring surrounding and rotatably supported in said viewing opening and also having upper and lower halves of distinctive colors providing a horizon-defining line of demarcation therebetween normally in line with said other horizontal line, and a driving connection between said gimbal and said ring such that the line of demarcation on said ring shows roll attitude divorced from pitch.

2. In an attitude indicator for aircraft, the combination comprising a housing having a viewing opening in a wall thereof, graduations on said wall adjacent said opening and calibrated in accordance with angles of roll, a member having a spherical face positioned in said housing to be viewed through said opening, said face having upper and lower halves of distinctive colors providing a horizon or equatorial line of demarcation therebetween, a gimbal pivotally supported about a roll axis in said housing, said member being pivotally supported in said gimbal about a normal pitch axis, means for positioning said gimbal in accordance with the roll attitude of said aircraft, means for positioning said member within its gimbal in accordance with the pitch attitude whereby said horizon line simulates apparent movements of the real horizon, a ring surrounding and rotatably supported in said viewing opening and having upper and lower halves of distinctive colors providing also a horizon-defining line of demarcation therebetween normally in line with said other horizontal line, a roll pointer cooperable with said indices mounted on said ring, and a driving connection between the means positioning said gimbal about said roll axis and said ring for positioning said pointer and demarcation line relative to said indices whereby to indicate the magnitude of the roll angle of said aircraft divorced from pitch.

3. In an attitude indicator for aircraft, the combination comprising a housing having a viewing opening in a wall thereof, an index on said wall adjacent said opening, a member having a spherical face positioned in said housing to be viewed through said opening, said face having upper and lower halves of distinctive colors providing a horizon or equatorial line of demarcation therebetween, a gimbal pivotally supported about a roll axis in said housing, said member being pivotally supported in said gimbal about a normal pitch axis, means for positioning said gimbal in accordance with the roll attitude of said aircraft, means for positioning said member within its gimbal in accordance with the pitch attitude whereby said horizon line simulates apparent movements of the real horizon, a ring surrounding and rotatably supported in said viewing opening and having upper and lower halves of distinctive colors providing also a horizon-defining line of demarcation therebetween normally in line with said other horizontal line, graduations cooperable with said index mounted on said ring, and a driving connection between the means positioning said gambal about said roll axis and said ring for positioning said pointer and demarcation line relative to said indices whereby to indicate the magnitude of the roll angle of said aircraft divorced from pitch.

References Cited in the file of this patent
UNITED STATES PATENTS

| | | |
|---|---|---|
| 2,412,961 | Braddon | Dec. 24, 1946 |
| 2,696,597 | Chombard | Dec. 7, 1954 |
| 2,700,898 | Fragola et al. | Feb. 1, 1955 |
| 2,737,640 | Barnaby | Mar. 6, 1956 |